Oct. 25, 1955  J. MELZER  2,721,396
CAN END TREATING MACHINE
Filed June 5, 1951  7 Sheets-Sheet 1

INVENTOR.
JULIUS MELZER
BY Charles H. Erne
Leland R. McCann
George W. Reifer
ATTORNEYS Oct. 25, 1955   J. MELZER   2,721,396
CAN END TREATING MACHINE
Filed June 5, 1951   7 Sheets-Sheet 5

Fig. 5

INVENTOR.
JULIUS MELZER
BY Charles H. Erne
Leland R. McCann
George W. Reiber
ATTORNEYS United States Patent Office 2,721,396
Patented Oct. 25, 1955

2,721,396

CAN END TREATING MACHINE

Julius Melzer, Bellaire, N. Y., assignor to American Can Company, New York, N. Y., a corporation of New Jersey Application June 5, 1951, Serial No. 229,955

9 Claims. (Cl. 34—149)

The present invention relates to machines for drying and curing sealing compounds or other materials in can or container ends or other flat articles and has particular reference to a machine having progressively arranged treating stations and means for feeding stacks of can ends into, through and out of such stations.

An object of the instant invention is the provision of a can end drying machine wherein the can ends may be processed through slow heat treatments of progressively increasing temperatures and then cooled before discharge to properly dry and cure sealing compounds which require a long time and high temperatures to effect drying and curing.

Another object is the provision of such a machine wherein its novel structure provides for flexibility in the type of can ends dried so that square, oblong and other shaped can ends may be passed through the machine as readily as the usual round can ends, without the use of change parts.

Another object is the provision of such a machine wherein the can ends are first assembled in spaced relation in unit stacks, and the unit stacks inserted into a carrier member and carried through the machine in this stacked, vertically spaced relation so as to facilitate circulation of a drying medium between the can ends and to minimize frictional engagement of the ends with moving parts which might mar or scratch the ends during the drying operation.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the invention the drawings illustrate a rotary type treating machine for drying and curing a fluid sealing compound or other material applied to annular flanges of round sheet metal can ends A, although the invention is also adapted to drying other materials or to substances applied to can ends of other shapes or other flat articles.

The can ends A, with the sealing compound previously applied to their annular flanges, are received from any suitable source of supply and are fed into the machine individually and in a horizontal position, in spaced and timed processional order. In the machine, the individual can ends A are assembled into stacked formation to produce a vertical unitary stack B (Fig. 3), the can ends in the stack being held in spaced relation. When a stack B of a predetermined height is formed, the entire stack is advanced into a rotary carrier C. The carrier C supports each can end in the stack individually in spaced relation to adjacent can ends in the stack so that drying, curing and cooling mediums can be circulated under pressure between them.

While thus supporting the stack of can ends, the carrier C advances the stack through a first stage drying compartment or chamber D (Fig. 3), a second stage drying or curing compartment or chamber E, and a cooling compartment or chamber F. If desired, any number or combination of heating, drying and other compartments or chambers may be arranged along the circular path of travel of the stack of can ends to progressively treat the can ends or the material applied to them to effect a desired result.

Figure 3:
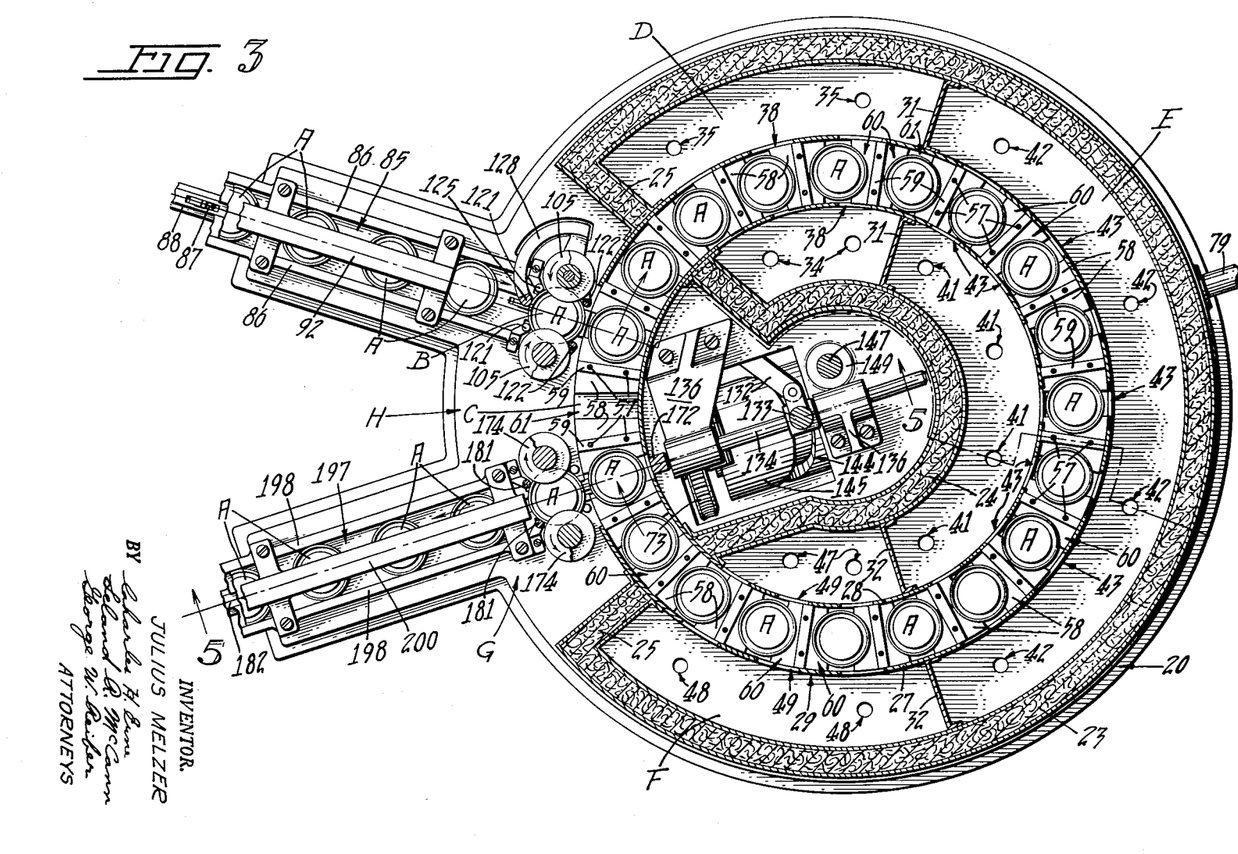
Figs. 3 and 4 are horizontal sections taken substantially along the lines 3—3, 4—4 in Fig. 2, with parts broken away, Fig. 4 being a bottom view looking up.

After completing the passage of the stack along a circular path of travel through the various treating compartments, the carrier C advances the stack to a position adjacent a discharge station G (Fig. 3). At this station the entire stack B of can ends is pushed out of the carrier and while remaining in stacked formation the can ends are discharged individually from the bottom of the stack in spaced and timed processional order to any suitable place of discharge. This completes the cycle of operation of the machine.

Figure 1:
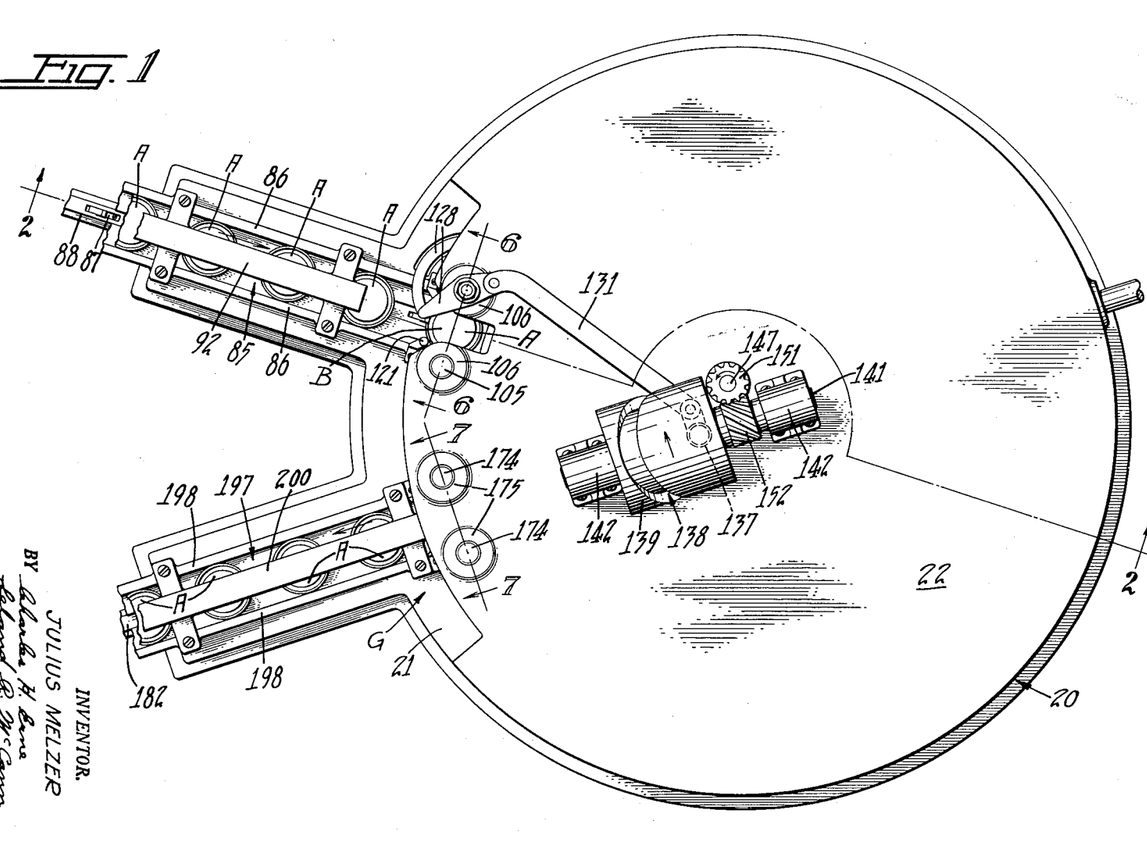
Figure 1 is a top plan view of a drying machine embodying the instant invention, with parts broken away.
Figure 2:
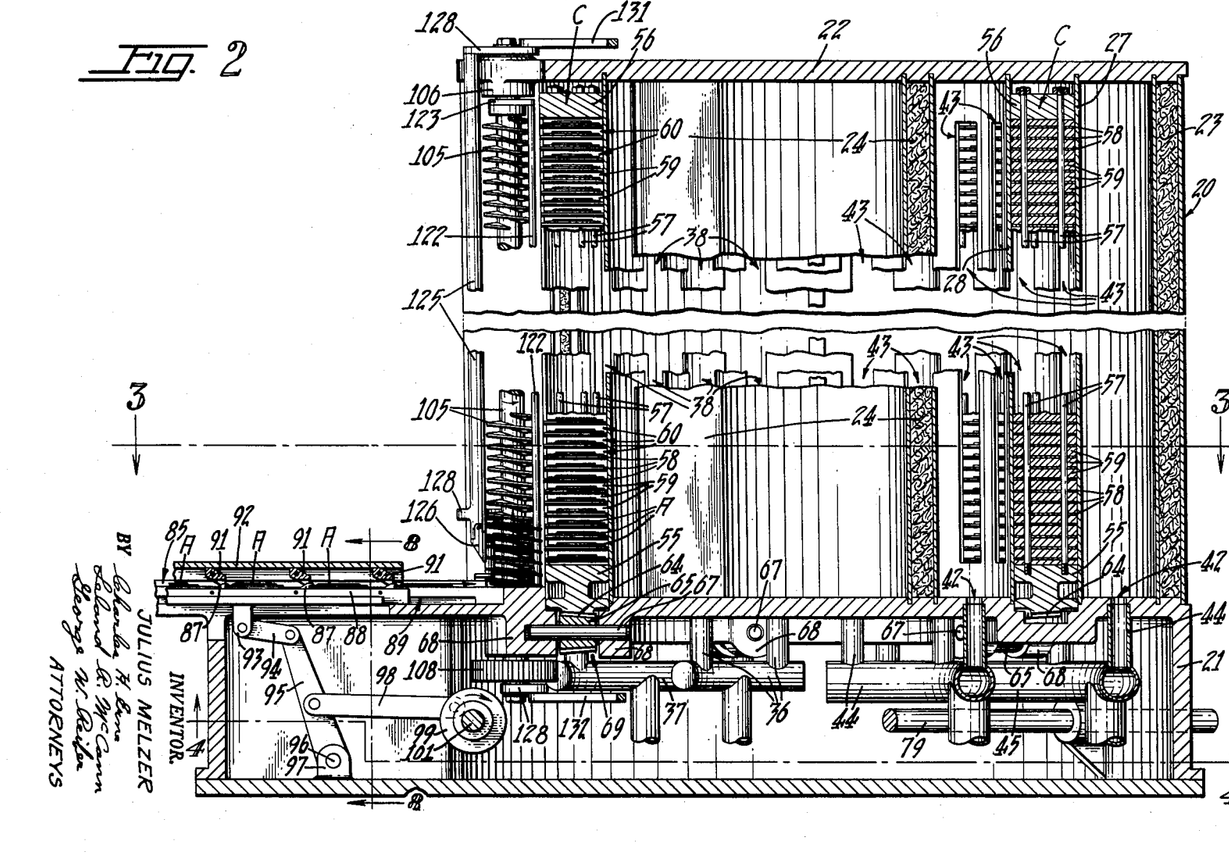
Fig. 2 is a vertical sectional view taken substantially along the broken line 2—2 in Fig. 1, with parts broken away.
Figure 4:
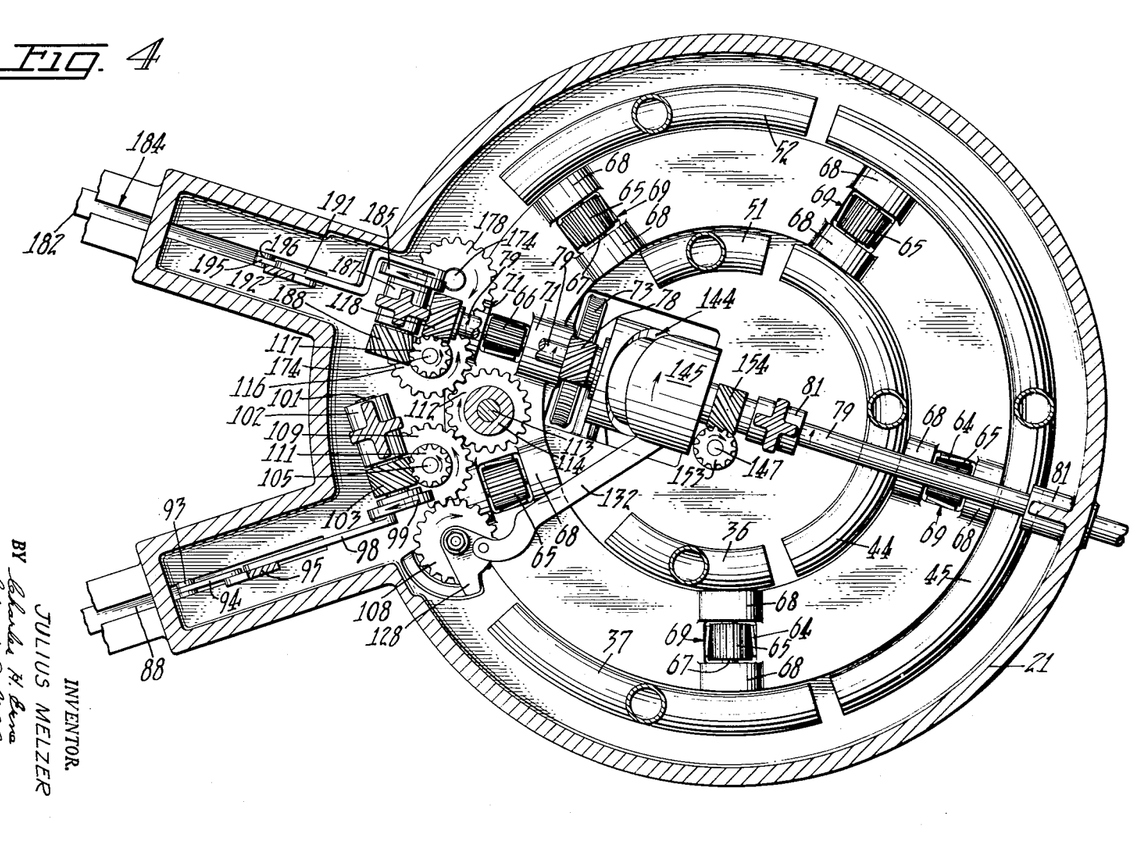

The machine structure comprises primarily a vertical, cylindrical dryer housing 20 (Figs. 1, 2 and 3) which is mounted on a hollow base 21 (see also Fig. 4) and is provided with a flat top plate or cover 22. The housing 20 preferably is provided with a thick, insulated outer circular wall 23 and in spaced relation thereto a thick, insulated inner concentric circular wall 24. These walls extend around or enclose the housing throughout an arcual distance of approximately 270 degrees and terminate in connecting substantially radially disposed, thick insulated walls 25. The remaining space of approximately 90 degrees and the area inwardly of the inner wall 24 are left open to provide an entrance and discharge opening H to accommodate other parts of the machine for feeding the can ends into the machine and for discharging them therefrom.

Between the outer walls 23 and the inner walls 24, the interior of the housing 20 is provided with a pair of spaced and concentric annular guide walls 27, 28 which between them define an annular space or channel 29 for the carrier C. These guide walls 27, 28 and channel 29 extend through all the chambers D, E and F and also into the entrance and discharge opening H. Radial partition walls 31, 32 connecting the annular carrier guide walls 27, 28 to the outer and inner housing walls 23, 24 divide the interior of the housing to provide the drying chamber D, the drying and curing chamber E, and the cooling chamber F.

Suitable drying and cooling mediums are circulated through the chambers D, E, F to effect the treating of the can ends in the carrier C in the channel 29. For this purpose the bottom of the drying chamber D is provided with inlet holes 34 (Fig. 3) and outlet holes 35 for the circulation through the chamber of a drying medium such as heated air. The inlet holes 34 communicate with an inlet pipe 36 (see also Figs. 2 and 4) located in the machine base 21. This pipe leads to any suitable source of the drying medium. The outlet holes 35 communicate with an outlet pipe 37 also located in the machine base 21 and which returns the spent drying medium to its source or to a suitable place of discharge as desired. Vertical slots 38 in the carrier guide walls 27, 28 permit the circulation of the medium through the carrier C in the carrier channel 29.

In a similar manner, the bottom of the drying and curing chamber E is provided with inlet holes 41 (Fig. 3) and outlet holes 42 for the circulation of a drying and curing medium through the chamber and through vertical slots 43 in the carrier guide walls 27, 28 and channel 29. The inlet holes 41 communicate with an inlet pipe 44 (Figs. 2 and 4) located in the machine base 21 and which leads to any suitable source of the drying and curing medium. The outlet holes 42 communicate with an outlet pipe 45 also located in the machine base 21 and which returns the spent drying and curing medium to its source or to a suitable place of discharge.

Like the chamber D and the chamber E the bottom of the cooling chamber F is provided with inlet holes 47 (Fig. 3) and outlet holes 48 for the circulation of a cooling medium through the chamber and through vertical slots 49 in the carrier guide walls 27, 28 and channel 29. The inlet holes 47 communicate with an inlet pipe 51 (Fig. 4) located in the machine base 21 and which leads to any suitable source of the cooling medium. The outlet holes 48 communicate with an outlet pipe 52 also located in the machine base 21 and which returns the spent cooling medium to its source or to a suitable place of discharge.

The can end carrier C located in the carrier channel 29 in the housing 20, preferably is an annular ring structure or wheel comprising a base ring 55 (Fig. 2) and a vertically spaced and parallel top ring 56, the two rings being connected at spaced intervals by pairs of vertical bolts 57. Between the base and top rings 55, 56, the bolts 57 extend through and hold in place a plurality of short horizontal shelf plates 58 and spacer blocks 59. The spacer blocks are of a height slightly greater than the thickness of a can end and there is one block 59 interposed between each pair of shelf plates 58, thus spacing the shelf plates apart vertically a distance slightly greater than the thickness of a can end to receive and hold the can ends in vertically spaced tiers or stacked relation. The arcual distance between the spacer blocks 59 is slightly greater than the diameter of a can end A (as best shown in Fig. 3). The spacer blocks and shelf plates thus provide annularly disposed tiers of can end pockets 60. In each pocket the ends of the shelf plates are spaced apart to provide transverse openings 61 (Fig. 3).

This carrier wheel C is mounted for rotation within the carrier channel 29. For this purpose the bottom face of the base ring 55 of the wheel is formed with gear teeth 64 (Figs. 2, 4 and 5) which rest on and mesh with a plurality of idler pinions 65 and a driving pinion 66 (Fig. 4) carried in the machine base 21. The idler pinions 65 are mounted on short horizontally and radially disposed shafts 67 carried in bearings 68 depending from the upper wall of the machine base 21. The pinions are disposed in openings 69 in this wall.

Figure 9:
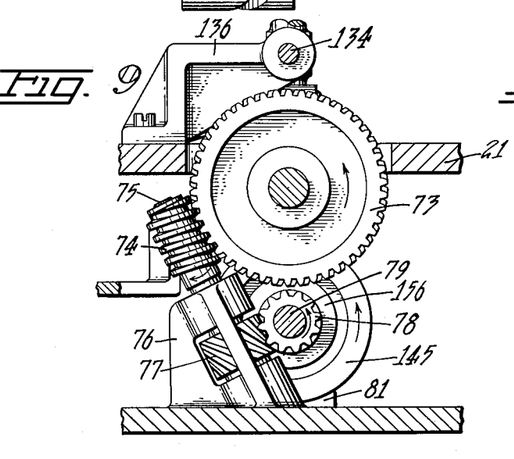
Figs. 9 and 10 are sectional details taken substantially along the broken lines 9—9, 10—10 in Fig. 5, with parts broken away.
Figure 10:
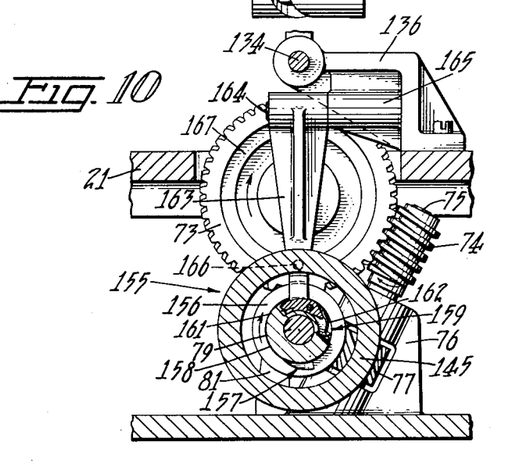
Figure 11:
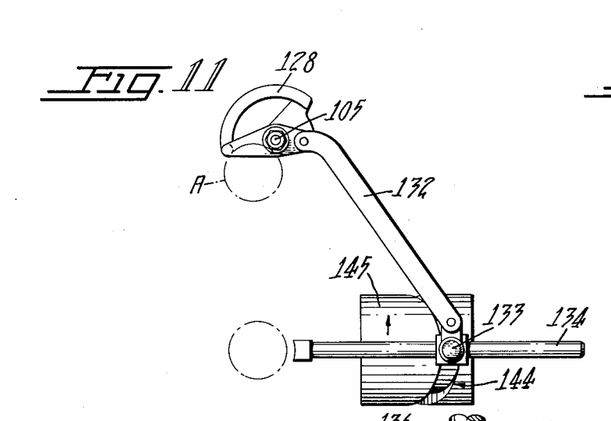
Figs. 11 and 12 are schematic plan views of the cam actuated device for introducing and removing unit stacks of can ends into and from the carrier member, the two views showing the parts of the device in different positions.
Figure 12:
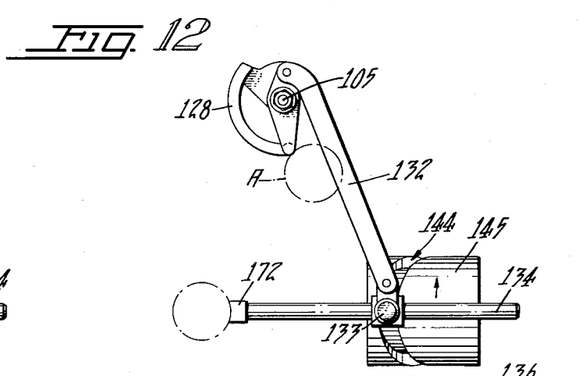

The driving pinion 66 (Fig. 5) is formed with trunnions which are journaled in bearings 71 formed in the machine base 21. The inner trunnion carries a worm wheel 73 (see also Figs. 4, 9 and 10) which meshes with and is driven by a worm 74 mounted on an angularly disposed shaft 75 journaled in a bearing bracket 76 formed integrally with the machine base 21. The worm shaft 75 also carries a helical gear 77 which meshes with and is driven by a mating helical gear 78 carried on a main drive shaft 79 which constitutes the main drive shaft of the machine. This main drive shaft 79 is journaled in spaced bearing brackets 81 in the machine base 21. The shaft is continuously rotated in any suitable manner. Through the above described connection with this main shaft, the carrier wheel C is rotated slowly in the carrier channel 29 of the housing 20. This rotation preferably is continuous although if desired it could be made intermittent by the interposition of a one revolution clutch on the main shaft for obtaining a step-by-step rotation of the carrier wheel C.

Figure 8:
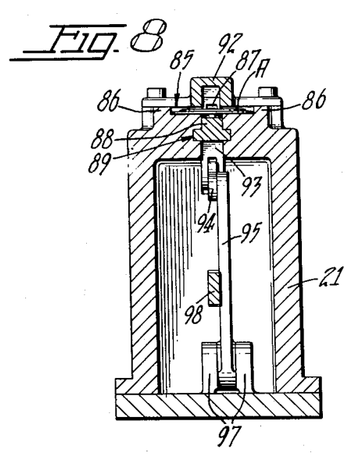
Fig. 8 is an enlarged sectional view taken substantially along the line 8—8 in Fig. 2.

During the rotation of the carrier wheel C, the can ends A as hereinbefore mentioned, are assembled in stack formation and are inserted in the carrier wheel C for advancement through the treating chambers D, E and F. The can ends A are received from any suitable source of supply, preferably the can end lining machine which applies the fluid sealing compound to the flanges of the can ends. These can ends, moving in a procession in spaced and timed order, are received in a horizontal entrance runway 85 (Figs. 1, 2 and 3) having a pair of spaced and parallel side guide rails 86 secured to the machine base 21 and extending into the entrance and discharge opening H in the housing 20 toward the carrier wheel C. The received can ends are advanced on a feed-in path along this runway by yieldable feed dogs 87 carried in a reciprocating stroke bar 88 sliding in a groove 89 (see Figs. 2 and 8) in the machine base 21. Holding fingers 91 disposed in a bar 92 located above the path of travel of the can ends prevent return of the advanced can ends with the stroke bar.

The stroke bar 88 is reciprocated through a forward or feeding stroke and thence through a return stroke by crank action. For this purpose the stroke bar is provided with a depending lug 93 (Figs. 2 and 8) which is connected by a link 94 to an upright actuating arm 95 mounted at its lower end on a pivot pin 96 secured in a pair of spaced bearings 97 extending up from the bottom of the machine base 21. Intermediate its ends the actuating arm 95 is pivotally connected to one end of a pitman 98. The opposite end of the pitman is pivotally connected to a crank disc 99 (see also Fig. 6) mounted on a crank shaft 101 journaled in a bearing bracket 102 in the machine base 21. The crank shaft 101 carries a driving helical gear 103 which is rotated continuously through a gear train hereinafter fully explained and driven from the main shaft 79.

Hence through the rotation of the driving gear 103 and the crank disc 99, the stroke bar 88 is reciprocated to advance the procession of can ends A into the machine. At the terminal end of the runway 85, immediately adjacent the carrier wheel C, the stroke bar 88 feeds the innermost can end A into position between a pair of vertical stacking screws 105 (Figs. 2, 3 and 6) disposed one on each side of the path of travel of the can ends. The upper ends of the screws 105 are provided with trunnions which are journaled in bearings 106 formed in the top plate 22 of the housing 20. The lower ends of the screws are also provided with trunnions which are journaled in a bearing block 107 in the machine base 21. Below the bearing block the screw trunnions carry meshing gears 108, 109 which rotate the screws in unison and in opposite directions as indicated by the arrows in Figs. 3 and 6. The trunnion of the screw 105 which carries the gear 109 also carries a helical gear 111 which meshes with and drives the helical gear 103 on the stroke bar crank shaft 101.

The screw gear 109 is driven by an idler gear 112 (Figs. 4 and 5) mounted on a vertical pin 113 carried in a bearing 114 which extends up from the bottom of the machine base 21. The idler gear 112 meshes with and is driven by a discharge screw gear 116 which is driven by a helical pinion 117 meshing with a helical gear 118 carried on and driven by the main drive shaft 79. Through this gear train the two stacking screws 105 are continuously rotated in unison. The pitch of the screws 105 is substantially equal to the height of the pockets 60 in the carrier wheel C.

Hence as the can ends C are individually advanced into position between the stacking screws 105, the screws engage under the flanges of the can ends and elevate the can ends to build up a unit stack B of vertically spaced apart can ends. During this elevation of the can ends they are retained in stacked formation in the screws by a pair of stationary vertical guide bars 121 (Fig. 3) disposed adjacent the screws on the side at which the can ends enter and by a pair of yieldable vertical guide rails 122 disposed adjacent the opposite side of hte screws, between the screws and the carrier wheel C. The yieldable guide rails 122 are carried at the top and bottom ends in spring held pivot arms 123 (Fig. 6) which are loosely mounted on the upper and lower trunnions of the screws for swinging relation thereon as will be explained hereinafter.

When sufficient can ends have been received and elevated by the stacking screws 105 to produce a vertical unit stack of the same height as the carrier wheel C, the entire stack is pushed from the screws, and past the yieldable guide rails 122 toward and into the carrier wheel C. This transfer is effected in time with the rotation of the carrier wheel C so that a tier of the carrier wheel pockets 60 will be directly opposite the stack of can ends in the screws when the transfer takes place. Since the pitch of the screws is the same as the vertical distance between the carrier wheel pockets 60, there will be one can end in the stack for each pocket 60 in the tier and the ends will be in horizontal alignment with the pockets to insure safe transfer of the ends from the screws to the pockets.

This transfer of the can ends from the screws 105 to the tier of pockets 60 in the carrier wheel C is effected by a vertical pusher bar 125 (Figs. 2, 3 and 6) which is disposed between the screws on the same side as the stationary guide rails 121. The pusher bar 125 at its upper end extends the full height of the carrier wheel C and at its lower end is slightly shorter than the length of the screws to permit can ends to pass under the lower end of the bar as they continue to be fed into the lower threads of the screws during the transfer of the stack. The lower end of the pusher bar is provided with a hinged extension 126 (Fig. 2) to permit rigid action during the pushing stroke of the bar and yielding action on the return stroke so as to drag loosely over a newly elevated can end which may engage the pusher bar on its return stroke.

Figure 5:
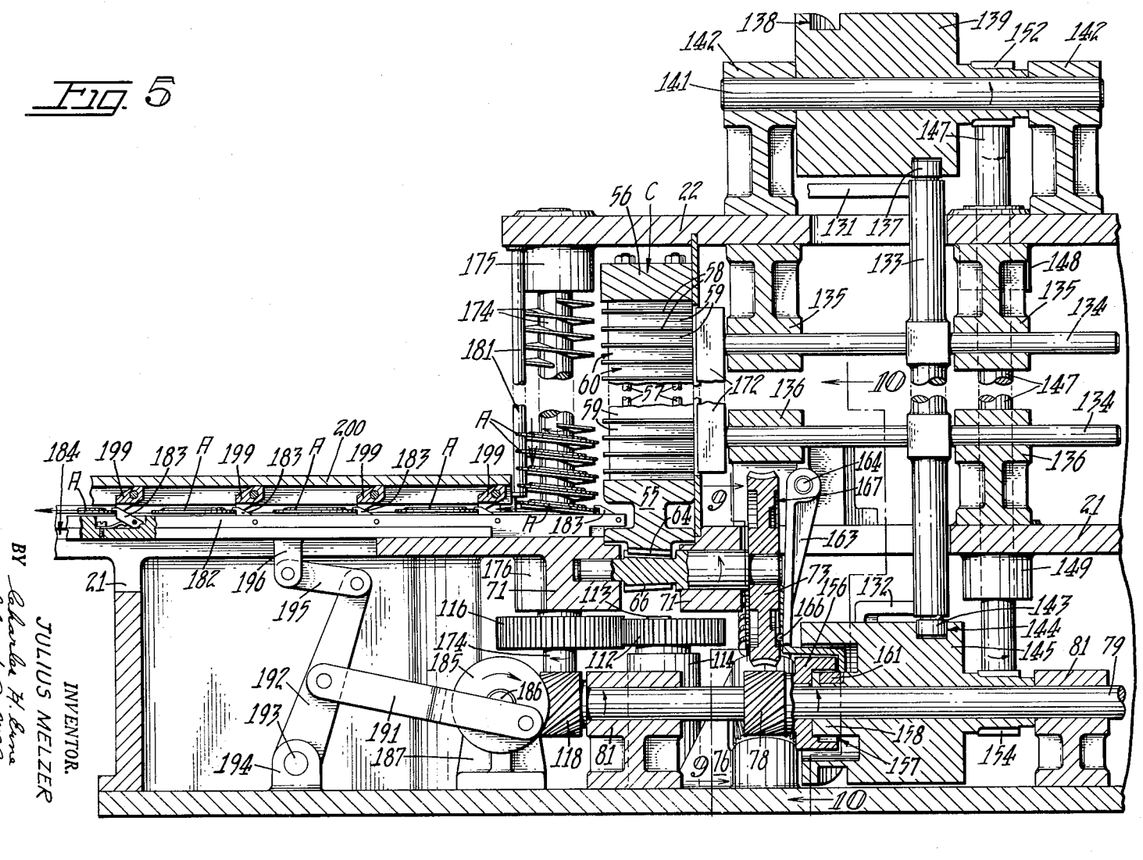
Fig. 5 is an enlarged vertical sectional view taken substantially along the line 5—5 in Fig. 3, with parts broken away.
Figures 6, 7:
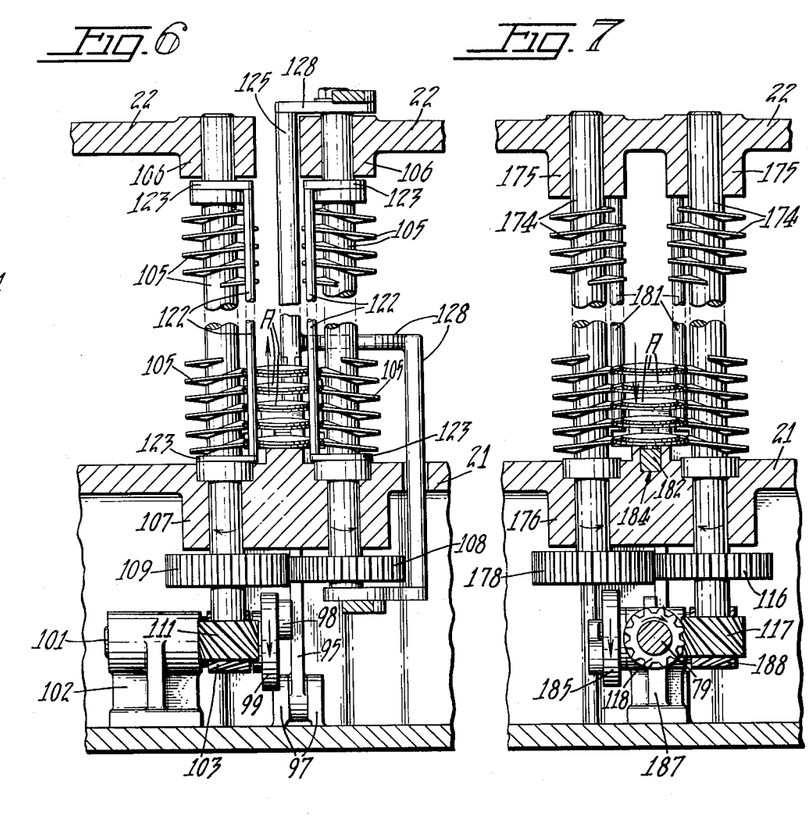
Figs. 6 and 7 are enlarged vertically sectional views taken substantially along the lines 6—6, 7—7 in Fig. 1, with parts broken away.

The pusher bar 125 is carried on a pair of curved arms 128 which are pivotally mounted on the upper and lower trunnions of one of the stacking screws 105 (see Fig. 6). These arms 128 are swung inwardly through a pushing stroke and thence outwardly through a return stroke by cam action. For this purpose, the upper arm 128 is connected by a link 131 (Figs. 1 and 5) and the lower arm 128 is connected by a link 132 (Figs. 3, 4, 5, 11 and 12) to a vertical actuating rod 133 (Fig. 5). The actuating rod 133 is secured to a pair of horizontal, spaced and parallel guide bars 134 slideably carried in a pair of spaced bearings 135 depending from the housing top plate 22 and a similar pair of spaced bearings 136 mounted on the machine base 21.

The upper end of the vertical actuating rod 133 carries a cam roller 137 (Figs. 1 and 5) which operates in a cam groove 138 of a barrel cam 139 mounted on a horizontal shaft 141 journaled in a pair of spaced bearings 142 on the top plate 22 of the housing 20. In a similar manner, the lower end of the vertical actuating rod 133 carries a cam roller 143 (Fig. 5) which operates in a cam groove 144 (see also Figs. 3, 4, 11 and 12) of a barrel cam 145 loosely mounted on the drive shaft 79 and periodically rotated through one revolution as will be hereinafter explained.

The cam grooves 138, 144 of the two cams 139, 145 are shaped for co-operative action to reciprocate the vertical actuating rod 133 in lateral directions to effect the inward and outward travel of the pusher bar 125. For this purpose the two cams 139, 145 are connected together for rotation in unison by a vertical gear shaft 147 (Figs. 1, 3, 4 and 5) which is journaled in a pair of spaced bearings 148, 149 formed respectively in the top plate 22 of the housing and in the machine base 21. At its upper end the gear shaft 147 carries a helical gear 151 (Fig. 1) which meshes with and drives a helical gear 152 formed on the upper cam 139. At its lower end the gear shaft 147 carries a helical gear 153 (Fig. 4) which meshes with a helical gear 154 formed on the lower cam 145. Thus when the lower cam 145 rotates, it drives the vertical gear shaft 147 and through this shaft rotates the upper cam 139 in unison with the lower cam.

The periodic rotation of the lower cam 145 is brought about through a one revolution clutch device 155 (Fig. 10) and is effected in time with the building up of a unit stack of can ends and the rotation of the carrier wheel C. The clutch device 155 includes a continuously rotating clutch ring 156 (Figs. 5 and 10) having an internal driving notch 157. This clutch ring 156 is formed with a hub mounted on and keyed to the main drive shaft 79 and therefore the ring rotates continuously with the drive shaft. The clutch ring surrounds a hub 158 on the lower cam 145. This cam hub is provided with a recess 159 which contains a pivotally mounted clutch finger 161 urged outwardly toward the inner surface of the clutch ring by a flat spring 162 secured to the cam hub.

The clutch finger 161 is held normally in a retracted position within its recess 159 by a clutch lever 163, the lower end of which is disposed adjacent the cam hub 158 and engages against the outer face of the clutch finger. This prevents the finger from engaging in the notch 157 of the rotating clutch ring 156 and thus normally holds the lower cam 145 stationary. The clutch lever 163 extends upwardly adjacent the carrier wheel driving worm wheel 73 and at its upper end is mounted, for swinging movement toward and away from the worm wheel, on a pivot pin 164 secured in a boss 165 formed on the adjacent bearing bracket 136. Adjacent its lower end the clutch lever 163 carries a cam button 166 which rides on a face cam 167 formed on the adjacent face of the worm wheel 73. This face cam 167 is provided with a high spot properly located to push the lever 163 toward the right (as viewed in Fig. 5) at the proper time to actuate the clutch device 155.

This action takes place once for each revolution of the worm wheel 73. During this revolution of the worm wheel, the carrier wheel C is advanced by the worm wheel and its auxiliary driving pinion 66 an arcual distance equivalent to the width of one tier of can end pockets 60 in the carrier wheel. When an empty tier of pockets 60, approaching the stacking screws 105 to receive a stack of can ends, moves into a centralized position relative to the stack of can ends in the screws, the face cam 167 on the worm wheel 73 pushes the clutch lever 163 away from the worm wheel and this shifts the lower end of the lever laterally out of engagement with the clutch finger 161. The clutch finger 161 is thus released and its spring 162 forces the finger outwardly into engagement with the inner surface of the rotating clutch ring 156. The finger 161 thereupon engages in the driving notch 157 of the clutch ring and through this engagement the clutch ring is locked with and rotates the lower cam 145. The two cams 139, 145 thereupon rotate through one revolution and thus actuate the pusher arms 128 and the pusher bar 125 through one cycle of operation to effect the transfer of the stack of can ends from the stacking screws 105 into the aligned empty tier of pockets 60 in the carrier wheel C.

As soon as the released clutch finger 161 has engaged in the driving notch 157 of the clutch ring 156 and has rotated itself by rotation of the lower cam 145, out of the region of the lower end of the clutch lever 163, the face cam 167 on the worm wheel 73 permits the clutch lever 163 to move toward the worm wheel and thus reposition the lower end of the lever into the path of travel of the now rotating clutch finger. Thus near the completion of one revolution of the lower cam 145, the clutch finger 161 rides under the lower end of the lever 163 and at the completion of the revolution or cycle of operation of the cam 145, is depressed into its recess 159 and disengaged from the driving notch 157 of the clutch ring 156. The cams 139, 145 thereupon cease rotation and remain stationary until the next cycle of operation while the clutch ring 156 continues to rotate with the main drive shaft 79 so that the shaft continues to rotate the carrier wheel C and thus advances the filled tier of pockets 60 toward the treating chambers while simultaneously advancing the next empty tier of pockets into position adjacent the stacking screws 105 to receive the next unit stack of can ends built up by the screws.

The continuously rotating carrier wheel C slowly advances the received stacks of can ends A through the drying chamber D, the drying and curing chamber E, and the cooling chamber F. In each of these chambers the treating medium circulated through the chambers, passes through the vertical slots 38, 43, 49 in the carrier wheel guide walls 28, 29 in the housing 20 and sweeps through the can end pockets 60 in the carrier wheel C, thus treating the sealing compound in the flanges of the can ends held in the wheel pockets, as the carrier wheel carries the can ends from one chamber to the other.

Upon completion of this advancement of the can ends through the various treating chambers, and as they emerge from the last chamber (the cooling chamber F), the carrier wheel C advances the treated can ends into the discharge station G. At this station, the entire stack of can ends in a tier of pockets 60 of the carrier wheel C is discharged from the carrier wheel. This discharge is effected by a vertical discharge bar 172 (Figs. 3, 5, 11 and 12) which is disposed adjacent the inner periphery of the carrier wheel C and is supported on the adjacent ends of the two guide rods 134. Since these guide rods 134 move with the vertical actuating rod 133 through the action of the upper and lower cams 139, 145, the operation of the discharge bar 172 is effected simultaneously with and through the same mechanism as the operation of the transfer pusher bar 125. Thus while a stack of the can ends is being inserted into the carrier wheel C at the entrance station, a treated stack of can ends is being discharged from the carrier wheel at the discharge station.

During this discharge of the stack of can ends from the carrier wheel C, the discharge bar 172 moves outwardly into the space 61 between the can end supporting shelves 58 of the wheel and thus engages behind the can ends and pushes them out of the wheel. The entire stack of ends is received in a pair of vertically disposed spaced and parallel discharge screws 174 (Figs. 3, 5, and 7) which are similar to the stacking screws 105. The ends of these discharge screws 174 are provided with trunnions which are journaled in upper bearings 175 formed in the top plate 22 of the housing 20 and in a bearing block 176 in the machine base 21. The pitch of the screws is equal substantially to the pitch of the stacking screws 105 to facilitate reception of the can ends in their spaced relation from the pockets of the carrier wheel C.

The discharge screws 174 are continuously rotated in a direction opposite to that of the stacking screws 105 so that the can ends will be moved downwardly. For this purpose the lower trunnions of the discharge screws 174 carry a pair of meshing gears which rotate the screws in unison. One of these gears is the gear 116 (Figs. 4 and 7) which is driven by the helical gear 117 meshing with the helical gear 118 on the main drive shaft 79. The other gear is a gear 178 which is driven by the gear 116.

The stack of can ends received in the discharge screws 174 is retained in stacked relation while in the screws by a pair of outer stationary vertical guide bars 181 (Figs. 3, 5 and 7). The rotation of the discharge screws and the slope of the screw threads is toward these guide bars 181 and hence the can ends are pressed into engagement with the bars and thus retain their stacked formation without the use of any rear guide bars.

As the discharge screws 174 rotate, they carry the stacked can ends downwardly toward a reciprocating stroke bar 182 (Figs. 3, 4, 5 and 7) having a plurality of spring held feed dogs 183. The stroke bar 182 operates in a slide groove 184 in the machine base 21. Reciprocation of the stroke bar is effected by a crank disc 185 carried on a short shaft 186 journaled in a bearing bracket 187 in the machine base 21. The shaft is rotated by a helical gear 188 (Figs. 4 and 7) carried on the shaft and meshing with the helical gear 117. Hence the crank disc 185 is rotated in time with the other moving parts of the machine.

The crank disc 185 is connected by a crank arm 191 to an upright actuating lever 192 mounted at its lower end on a pivot pin 193 carried in a pair of spaced lugs 194 which extend up from the bottom of the machine base 21. At its upper end the actuating lever 192 is connected by a link 195 to a pair of spaced depending lugs 196 of the stroke bar 182.

Hence as the crank disc 185 rotates, it rocks the actuating lever 192 and thus reciprocates the stroke bar 182 outwardly through a discharge or feeding stroke and thence through a return stroke. On the discharge stroke the innermost feed dog 183 engages behind the lowest can end A in the stack of ends in the discharge screws 174 and feeds the can end out of the screws and along a runway 197 (Fig. 3) defined by side guide rails 198. As each can end is thus moved down by the screws the stroke bar 182 removes it and advances it outwardly along the runway in a step-by-step advancement to any suitable place of deposit. Hold-back dogs 199 (Fig. 5) disposed above the path of travel of the can ends in the runway and pivotally connected to a stationary bar 200 engage behind the can ends as they are stepped along the runway and thus prevent their return with the stroke bar on its return stroke. This discharge of the treated can ends A to any suitable place of deposit completes the cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages the form hereinbefore described being merely a preferred embodiment thereof.

I claim:

1. A machine for treating can ends, comprising in combination a treating chamber, carrier means movable through said treating chamber, means for moving said carrier means, a pair of spaced and parallel elevator screws disposed adjacent the path of travel of said carrier means, means for feeding can ends singly along a feed-in path to the bottom of and between said screws, means for rotating said screws to advance said can ends axially between the screws and thus assemble said can ends into units each comprising a plurality of can ends arranged in spaced relation, a vertically disposed pusher bar spaced above said feed-in path of the can ends and mounted adjacent said screws for movement therebetween, means for moving said pusher bar to transfer each unit of assembled can ends from said elevator screws to said carrier means for the advancement of said can ends through said chamber for treatment, and means for discharging said can ends from said carrier means after treatment.

2. The combination according to claim 1 wherein the lower end of the pusher bar comprises a depending hinged extension normally biased to and rigidly supported in longitudinal alignment with the bar to serve as a part thereof in transferring a stack of can ends from the screws to said carrier, said hinged extension yielding on the return movement of the bar to drag loosely over a newly elevated can end in the elevator screws which may engage the pusher bar on its return movement.

3. A machine for treating can ends, comprising in combination a treating chamber, means for assembling units of a plurality of can ends in spaced apart relation to provide spaces between said can ends, carrier means movable through said treating chamber for receiving said units of assembled can ends and for carrying them through said chamber for treatment, means for moving said carrier means through said chamber, means for introducing said units of assembled can ends into said carrier means for advancement with said carrier means, a pair of spaced and parallel discharge screws each disposed substantially tangent to the path of travel of said carrier means, means for transferring each of said units of assembled can ends after treatment directly from said carrier to said discharge screws, means for rotating said screws in unison to move a said unit toward one end of the screws, and means for discharging said can ends individually from said end of the screws to a suitable place of deposit.

4. A machine for treating can ends, comprising in combination a treating chamber, a pair of spaced and parallel curved vertical guide plates disposed in and defining an annular channel in said chamber, said plates having spaced vertical slots therein, means for circulating a treating medium through said chamber and across said channel by way of said slots, an annular carrier member rotatable through said channel in said chamber around a vertical axis, said carrier member having a plurality of shelves arranged in vertically spaced relation for the reception of a plurality of can ends, means for rotating said carrier member, means for assembling a stack of a plurality of can ends arranged in vertically spaced apart relation, means for introducing said stack of can ends as a unit into said carrier member so that each can end in the stack is individually supported on a shelf of said carrier member for advancement through said chamber with said carrier member for treatment of said can ends, and means for discharging said can ends from said carrier member after treatment.

5. A machine for treating can ends, comprising in combination a treating chamber, an annular carrier member rotatable through said chamber around a vertical axis, said carrier member having a plurality of shelves arranged in vertically spaced relation for the reception of a plurality of can ends, means for rotating said carrier member, a pair of spaced and parallel vertical screws disposed adjacent the path of travel of said carrier member, means for feeding said can ends singly along a feed-in path to the lower ends of said vertical screws, means for rotating said vertical screws to elevate said can ends into a stack of a plurality of can ends arranged in vertically spaced relation and in alignment with the shelves in said carrier member, a vertically disposed and horizontally reciprocable pusher bar disposed adjacent said screws and spaced above said feed-in path of the can ends, means for actuating said pusher bar in time with the rotation of said carrier member to transfer said stack of can ends as a unit from said screws into said carrier member so that each can end in the stack is individually supported on a shelf of said carrier member for advancement through said chamber for treatment, and means for discharging said can ends from said carrier member after treatment.

6. A machine for treating can ends, comprising in combination a treating chamber, an annular carrier member rotatable through said chamber around a vertical axis, said carrier member having a plurality of shelves arranged in vertically spaced relation for the reception of a plurality of can ends, means for rotating said carrier member, means for assembling a stack of a plurality of can ends arranged in vertically spaced apart relation, means for introducing said stack of can ends as a unit into said carrier member so that each can end in the stack is individually supported on a shelf of said carrier member for advancement through said chamber with said carrier member for treatment of said can ends, a vertically disposed discharge bar located adjacent the path of travel of said carrier member, means for actuating said discharge bar in time with the rotation of said carrier member to remove said stack of can ends as a unit from the shelves of said carrier member after treatment, a pair of spaced and parallel vertical discharge screws disposed adjacent the path of travel of said carrier member for receiving said discharged stack of can ends from said carrier member, means for rotating said screws in a downward direction to lower said can ends individually from said stack, a stroke bar located beneath said discharge screws, and means for reciprocating said stroke bar in time with the rotation of said screws to remove the individually lowered can ends from said screws and to advance them to a suitable place of deposit.

7. A machine for treating can ends comprising in combination a treating chamber, means for assembling units of a plurality of can ends in spaced apart relation to provide spaces between said can ends, carrier means movable through said treating chamber for receiving said units of assembled can ends and for carrying them through said chamber for treatment, means for moving said carrier means through said chamber, means for introducing said units of assembled can ends into said carrier means for advancement with said carrier means, a pair of spaced and parallel discharge screws disposed adjacent the path of travel of said carrier means, a stationary vertical guide bar adjacent said discharge screws and serving as a guide for a stack of can ends resting on said discharge screws, means for rotating said screws in opposite directions to lower the can ends supported thereon, discharge means at the bottom of said discharge screws for removing each can end along a discharge path as it reaches the bottom of said discharge screws, said vertical guide bar being spaced above said discharge path of the can ends for permitting passage of the ends thereunder.

8. A machine for treating can ends, comprising in combination a treating chamber, carrier means movable through said treating chamber, means for moving said carrier means, a pair of spaced and parallel elevators disposed adjacent the path of travel of said carrier means for receiving can ends individually and assembling them into units of a plurality of can ends arranged in spaced relation, vertical guide rails movably mounted adjacent said elevators and biased toward said can ends on the elevators, feeding means for advancing can ends singly toward said guide rails and into said elevators, means for actuating said elevators to raise and assemble said can ends into units, means for transferring said units of assembled can ends from said elevators to said carrier means for the advancement of said spaced can ends through said chamber for treatment, said vertical guide rails being forced laterally by the can ends during said transfer to permit passage of the assembled can ends and then returning to their normal guiding positions for assembly of the next unit, and means for discharging said can ends from said carrier means after treatment.

9. A machine for treating can ends, comprising in combination a treating chamber, spaced and parallel vertical guide plates disposed in and defining a channel in said chamber, said plates having spaced vertical slots therein, means for circulating a treating medium through said chamber and across said channel by way of said slots, a carrier member movable through said channel in said chamber, said carrier member having a plurality of horizontal pockets arranged in vertically spaced relation for the reception of a plurality of can ends, means for moving said carrier member through said chamber, means for assembling a stack of a plurality of can ends arranged in vertically spaced apart relation, means for introducing said stack of can ends as a unit into said carrier member so that each can end in the stack is individually supported in said pockets of the carrier member for advancement through said chamber with said carrier member for treatment of said can ends, and means for discharging said can ends from said carrier member after treatment.

References Cited in the file of this patent

UNITED STATES PATENTS

| | | |
|---|---|---|
| 1,373,767 | Schaller | Apr. 5, 1921 |
| 1,518,791 | Hedstrom | Dec. 9, 1924 |
| 1,779,210 | Davis | Oct. 21, 1930 |
| 1,865,020 | Krueger et al. | June 28, 1932 |
| 2,479,049 | Poncelet | Aug. 16, 1949 |
| 2,656,911 | Boyce et al. | Oct. 27, 1953 |